United States Patent Office 3,560,452
Patented Feb. 2, 1971

3,560,452
PRODUCTION OF A PHENYL-SUBSTITUTED POLYACYLOXAMIDRAZONE
Ulrich Schulze, Elsenfeld, and Gerhard Meyer, Obernburg, Germany, assignors to Glanzstoff AG, Wuppertal, Germany
No Drawing. Filed July 2, 1969, Ser. No. 838,681
Claims priority, application Germany, July 10, 1968, P 17 70 846.2
Int. Cl. C08g 20/20, 20/22
U.S. Cl. 260—78
14 Claims

ABSTRACT OF THE DISCLOSURE

Production of a polyacyloxamidrazone bearing phenyl substitutents on the oxamidrazone portions of the linear polymer chain, the polymer being produced by reaction of N,N'-bis-(phenyl)-oxamidrazone with a dicarboxylic acid dichloride or dibromide in the presence of an acid acceptor. The resulting polycondensate exhibits valuable properties as a fiber-forming or film-forming product and is easily converted into the corresponding and more stable poly-bis(1,2,4-triazole) which is also phenyl-substituted.

---

In copending U.S. application, Ser. No. 716,364, there is disclosed a special process for the production of polyacyloxamidrazones which are linear polycondensates with recurring units of the formula

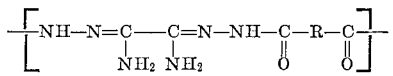

wherein R is a divalent organic radical of 2 up to about 12 carbon atoms, preferably 2 to 6 carbon atoms, in an essentially hydrocarbon structure, e.g. the 1,4-phenyl radical. In order to achieve especially high molecular weight polymers having favorable fiber- or film-forming properties, it was discovered to be essential to produce the polymer by reacting oxalic acid bisamidrazone with a dicarboxylic acid dichloride or dibromide in a special two phase solvent system in the presence of an acid acceptor while mixing and withdrawing the heat of reaction, the reaction temperature being maintained between about 0° C. and 60° C. The resulting product can be converted into a poly-bis-(1,2,4-triazole) by cyclodehydration at elevated temperatures.

It was previously known that this polycondensation could be carried out in a single phase solvent system, using a single solvent or two or even more solvents which are miscible with each other. In this case, however, the polycondensate has a lower molecular weight which results in less satisfying properties in films or fibers made therefrom. These lower molecular weight polycondensates are also characterized by their greater solubility in conventional solvents, at least until they are converted into the corresponding poly-bis-(1,2,4-triazole). In attempting to use a two phase solvent system of two different solvents which are normally immiscible, i.e. at most only slightly soluble in one another, it was also found to be difficult to achieve satisfactory high molecular weight film-forming or fiber-forming properties.

One object of the present invention is to provide a novel high molecular weight polyacyloxamidrazone which is capable of being produced using previously disclosed solvent systems while still enhancing the desired properties of this polymer. Other objects and advantages of the invention are explained in greater detail hereinafter.

It has now been found, in accordance with the invention that a new polyacyloxamidrazone with valuable properties can be produced by reacting N,N'-bis-(phenyl)-oxamidrazone of the formula

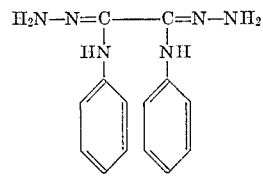

with an organic dicarboxylic halide of the formula

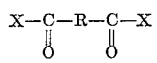

wherein X is chlorine or bromine and R is a divalent hydrocarbon radical of at least 2 up to about 12 and preferably 2 to 6 carbon atoms, with the reaction being carried out in an inert solvent or mixture of solvents at a temperature between about 0° C. and 40° C. and in the presence of an acid acceptor. As in previous polycondensations of this type, which are all strongly exothermic reactions, it is desirable to constantly mix the reaction medium while withdrawing the heat of reaction.

The resulting high molecular weight polyacyloxamidrazone consists essentially of recurring units of the formula

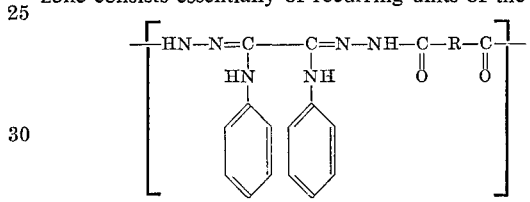

wherein R has the same meaning as above, i.e. as derived from the dicarboxylic acid halide. Especially useful products are achieved where R is phenyl and particularly the 1,4-phenyl radical.

The N,N'-bis-(phenyl)-oxamidrazone reactant is in itself a novel compound which can be obtained by the method explained in copending U.S. application, Ser. No. 838,429, filed July 2, 1969, the disclosure of which is incorporated herein by reference as fully as if set forth in its entirety. In essence, this reactant is prepared by reacting hydrazine with bis-(phenyl)-oximidochloride of the formula

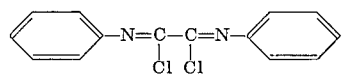

at a temperature of preferably about room temperature up to about 35° C. in an inert organic solvent, e.g. acetonitrile, preferably under substantially anhydrous conditions. The reactants are employed in stoichiometric amounts in accordance with the reaction equation:

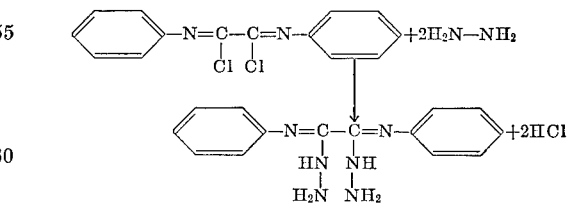

Actually, N,N'-bis-(phenyl)-oxamidrazone exists in the form of three tautomeric isomers, only two of the tautomeric formulae being used herein for simplicity. It should also be understod that the present invention is not directed to this novel reactant except as a means of achieving new and valuable polyacyloxamidrazones.

The bis-(phenyl)-oximidochloride is produced in a known manner (see R. Bauer, Chem. Ber. 40, 1907) from oxalic acid bis-anilide and phosphorus pentachloride. Oxalic acid bis-anilide, sometimes referred to as "oxanilide" is readily accessible by reaction of oxalic acid diethyl ester with aniline.

Suitable dicarboxylic acid dihalides for the production of the new polyacyloxamidrazones generally include the dibromides and especially the dichlorides of the following acids: adipic acid, sebacic acid, succinic acid, fumaric acid, glutaric acid, 1,4-cyclohexane dicarboxylic acid, homoterephthalic acid, isophthalic acid, naphthalene dicarboxylic acid, p,p'-diphenylether dicarboxylic acid and terephthalic acid. Especially valuable products are obtained by reacting the N,N'-bis-(phenyl)-oxamidrazone with terephthalic acid dichloride in approximately equimolar proportions. Any substantial excess of either of the reactants is generally avoided simply for economical reasons.

The use of an acid acceptor is desirable to achieve a better reaction rate by taking up the hydrogen chloride or bromide split off during polycondensation. Conventional acid acceptors can be used, including alkali metal carbonates or bicarbonates, especially those of sodium or potassium such as soda (sodium carbonate) or sodium bicarbonate, and also typical organic bases, e.g. tertiary organic nitrogen compounds such as pyridine or triethylamine. It is preferable to use an acid acceptor which is soluble in one or more of the solvents providing the reaction medium. In principle, however, any organic or inorganic basic-reacting compound may be used. As is customary, the acid acceptor is preferably added in at least a stoichiometric amount, i.e. an amount sufficient to bind the hydrogen halide which is liberated during the polycondensation.

A particular advantage of the present invention resides in the fact that the polycondensation reaction can be carried out in either a single phase or two phase solvent system, i.e. in the homogeneous phase of one or more organic solvents as well as in a two phase mixture of two different solvents which are immiscible with each other. A single or homogeneous phase solvent system is especially advantageous for purposes of the present invention, particularly a solvent or mixture of miscible solvents in which both monomeric components are soluble. The individual phases of the two phase solvent system may of course be made up of a single solvent or a mixture of solvents. In general, a skilled chemist can readily select any number of useful solvents for use in either a single or two phase system, e.g. by a routine determination of solubility characteristics with the monomeric reactants.

When working in the preferred single phase reaction medium, the solvent or mixture of misible solvents forming the homogeneous phase should be substantially inert to both of the individual monomeric reactants as well as being capable of dissolving each of these reactants. It is therefore preferable to select a suitable organic solvent for this single phase such as hexamethylphosphoric acid triamide because this compound can also serve as an acid acceptor.

Two phase solvent systems are also readily selected from common organic solvents which are combined so that one solvent is immiscible in the other. It is generally desirable to select one inert organic solvent for the dicarboxylic acid dihalide and a second distinct solvent for the phenyl-substituted oxamidrazone, preferably dimethyl formamide.

Suitable solvents for the dicarboxylic acid dihalides include the following: Methyl acetate, ethyl acetate, hexamethylphosphoric acid triamide, tetrahydrofuran, dioxane, hexane, heptane, cyclohexane, decalin, glycol carbonate, 1,2-dimethylglycol carbonate, oxalic acid diethyl ester, acetonitrile, malonic acid diethyl ester, chloroform and carbon tetrachloride. On the other hand, suitable solvents for the N,N'-dimethyl oxalic acid bisamidrazone include the following: acetonitrile, hexamethylphosphoric acid triamide, dimethyl formamide, N-methylpyrrolidone and butyrolacetone. These solvents for each component are set forth as typical examples, and it will be understood that they may be selected or combined so as to fulfill the condition of forming the preferred single homogeneous phase or else two phases which are immiscible with each other.

Thus, while hexamethylphosphoric acid triamide is the preferred single phase solvent, the following mixtures can also be used: carbon tetrachloride/dimethyl formamide; tetrahydrofuran/dimethyl formamide; or cyclohexane/dimethyl formamide.

The polycondensation reaction is most conveniently carried out in a temperature range of 0° C. to 20° C., or especially at about room temperature up to about 25° C., wherein the solution of the oxamidrazone is admixed under cooling with the solution of the dicarboxylic acid halide and well mixed throughout the reaction.

It is desirable to continue the polycondensation reaction until the phenyl-substituted polyacyloxamidrazone product has achieved a reduced viscosity of at least 0.2, preferably about 0.5 or more, this viscosity ($\eta_{red}$) being measured as a solution of 1 gram of polymer in 100 ml. of 98% $H_2SO_4$ at 20° C. The reduced viscosity is a measure of the molecular weight of the polymer, and a high molecular weight is especially desirable in achieving desirable film-forming or fiber-forming properties. However, the presence of two phenyl substituents in the polymer chain at regular repeated intervals according to the present invention is just as important as a high molecular weight in achieving desirable properties.

The phenyl-substituted polyacyloxamidrazones of the present invention readily split off water and cyclize by heating at temperatures of about 130° C. to 180° C. for about 4 hours. There is a substantially complete conversion into the corresponding poly-bis-(1,2,4-triazoles) consisting essentially of recurring units of the formula

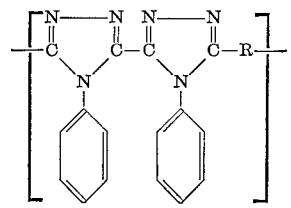

At lower temperatures or shorter periods of heating, partly cyclized products are formed.

As with the previous polyacyloxamidrazones, the novel polymers of the present invention are generally useful as plastic materials capable of being shaped into various products, especially films or fibers. Conversion of the phenyl-substituted polyacyloxamidrazone into its corresponding poly-bis-(1,2,4-triazole) is accomplished more easily by heating at reduced pressure, i.e. in a vacuum. The thermal resistance and resistance to solvents of the resulting cyclized product is very satisfactory.

The invention is further illustrated in detail by the following examples:

EXAMPLE 1

7.76 grams of terephthalic acid dichloride are dissolved in 35 ml. of hexamethylphosphoric acid triamide and then quickly introduced with stirring into a solution of 9.3 grams of N,N'-bis-(phenyl)-oxamidrazone and 7.73 grams of triethylamine in 60 ml. of hexamethylphosphoric acid triamide, this solvent as well as the triethylamine acting as an acid acceptor. By cooling with ice, the temperature is maintained at 20–25° C. After a reaction period of 50 hours, the polymer is precipitated by dilution of the deeply yellow colored, clear reaction mixture in ice water, and the polymer is then thoroughly washed. The viscosity ($\eta_{red}$), measured as a 1% solution of the polymer in 98% $H_2SO_4$ at 20° C., amounts to 0.5. The infrared spectrum of the polymer exhibits a strong amide band at 1640 cm.$^{-1}$.

EXAMPLE 2

To a solution of 13.55 grams of N,N'-bis-(phenyl)-oxamidrazone in 250 ml. of dimethyl formamide, there is first added 8.6 grams of sodium bicarbonate. With intensive mixing, a solution of 10.35 grams of terephthalic acid dichloride in 200 ml. of anhydrous tetrahydrofuran is further added and the two solvents mixed for 15 minutes under cooling. Thereafter, by the addition of water, the polymer completely precipitates and is centrifuged off, washed and dried. Its viscosity ($\eta_{rel}$), measured as in the preceding example, amounts to 0.33.

The linear phenyl-substituted polyacyloxamidrazone of the preceding example is heated for a period of 4 hours in a vacuum at 130° C. up to 180° C. The infrared spectrum of the resulting phenyl-substituted poly-bis-(1,2,4-triazole) no longer exhibits any amide band, thus indicating a substantially complete cyclization.

The invention is hereby claimed as follows:

1. A high molecular weight fiber-forming polyacyloxamidrazone consisting essentially of recurring units of the formula

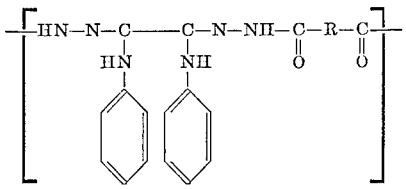

wherein R represents a divalent hydrocarbon radical of at least 2 up to about 12 carbon atoms.

2. A polyacyloxamidrazone as claimed in claim 1 wherein R is a divalent hydrocarbon radical of 2 to 6 carbon atoms.

3. A polyacyloxamidrazone as claimed in claim 1 wherein R represents the 1,4-phenyl radical.

4. A fiber-forming poly-bis-(1,2,4-triazole) consisting essentially of recurring units of the formula

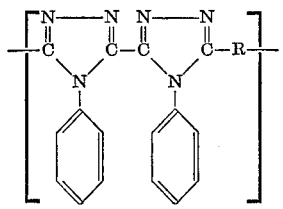

wherein R represents a divalent hydrocarbon radical of at least 2 up to about 12 carbon atoms.

5. A poly-bis-(1,2,4-triazole) as claimed in claim 4 wherein R represents the 1,4-phenyl radical.

6. A process for the production of a fiber-forming phenyl-substituted polyacyloxamidrazone which comprises reacting N,N'-bis-(phenyl)-oxamidrazone of the formula

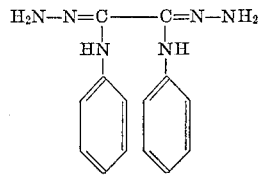

with an organic dicarboxylic acid halide of the formula

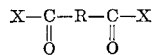

wherein X is chlorine or bromine and R is a divalent hydrocarbon radical of at least 2 up to about 12 carbon atoms, said reaction being carried out in at least one inert organic solvent at a temperature of about 0° C. to 40° C. and in the presence of an acid acceptor.

7. A process as claimed in claim 6 wherein said reaction is carried out at about room temperature up to 35° C.

8. A process as claimed in claim 6 wherein said reaction is carried out in a single homogeneous solvent phase of at least one inert organic solvent.

9. A process as claimed in claim 8, wherein said solvent consists essentially of hexamethylphosphoric acid triamide.

10. A process as claimed in claim 6 wherein said reaction is carried out in a two phase solvent system of different organic solvents which are immiscible in one another.

11. A process as claimed in claim 6 wherein said organic dicarboxylic acid dihalide is terephthalic acid dichloride.

12. A process as claimed in claim 11 wherein said reaction is carried out in a single homogeneous solvent phase consisting essentially of hexamethylphosphoric acid triamide.

13. A process as claimed in claim 11 wherein said reaction is carried out in a two phase solvent system in which one solvent is dimethyl formamide and the other solvent is selected from the class consisting of tetrahydrofuran, cyclohexane and carbon tetrachloride.

14. A process as claimed in claim 13 wherein the two phase solvent system consists essentially of tetrahydrofuran/dimethyl formamide.

References Cited

UNITED STATES PATENTS

| | | | |
|---|---|---|---|
| 3,130,182 | 4/1964 | Frazer | 260—78 |
| 3,376,267 | 4/1968 | Pruckmayr | 260—78 |
| 3,389,122 | 6/1968 | Culbertson | 260—78X |

OTHER REFERENCES

Saga et al.: Journal of Polymer Science, Part B, vol. 4, 1966, pp. 869–73.

Saga et al.: Chem. Abstracts, vol. 67, 1967, 117411j.

WILLIAM H. SHORT, Primary Examiner

H. SCHAIN, Assistant Examiner